US009975282B2

United States Patent
(12) United States Patent
Ozawa et al.
(10) Patent No.: US 9,975,282 B2
(45) Date of Patent: *May 22, 2018

(54) ACTIVE-ENERGY-RAY-CURABLE COMPOSITION, AND PROCESS FOR PRODUCING TRANSPARENT FILM HAVING FINE UNEVEN STRUCTURE ON SURFACE THEREOF

(75) Inventors: Satoru Ozawa, Hiroshima (JP); Katsuhiro Kojima, Hiroshima (JP); Yusuke Nakai, Hiroshima (JP)

(73) Assignee: Mitsubishi Chemical Corporation, Tokyo (JP)

( * ) Notice: Subject to any disclaimer, the term of this patent is extended or adjusted under 35 U.S.C. 154(b) by 937 days.

This patent is subject to a terminal disclaimer.

(21) Appl. No.: 13/990,426

(22) PCT Filed: Jan. 31, 2012

(86) PCT No.: PCT/JP2012/052099

§ 371 (c)(1),
(2), (4) Date: May 30, 2013

(87) PCT Pub. No.: WO2012/105539

PCT Pub. Date: Aug. 9, 2012

(65) Prior Publication Data

US 2013/0270748 A1 Oct. 17, 2013

(30) Foreign Application Priority Data

Jan. 31, 2011 (JP) ................................ 2011-018225

(51) Int. Cl.

| | |
|---|---|
| ***B29C 43/28*** | (2006.01) |
| ***B29C 59/04*** | (2006.01) |
| ***C08G 65/335*** | (2006.01) |
| *C08K 5/521* | (2006.01) |
| *C08K 5/00* | (2006.01) |
| *C08K 5/5397* | (2006.01) |

(52) U.S. Cl.

CPC .............. *B29C 43/28* (2013.01); *B29C 59/04* (2013.01); *C08G 65/3353* (2013.01); *B29C 59/046* (2013.01); *C08K 5/0025* (2013.01); *C08K 5/521* (2013.01); *C08K 5/5397* (2013.01)

(58) Field of Classification Search

CPC .... C08K 5/521; C08K 5/0025; C08K 5/5397; B29C 43/28; B29C 59/04; B29C 59/046; C08G 65/3353

See application file for complete search history.

(56) References Cited

U.S. PATENT DOCUMENTS

| | | | | |
|---|---|---|---|---|
| 5,389,704 | A * | 2/1995 | Yabu | 523/406 |
| 9,052,444 | B2 * | 6/2015 | Nakai | B29C 33/58 |
| 9,138,775 | B2 * | 9/2015 | Otani | B29C 59/046 |
| 2005/0148676 | A1 * | 7/2005 | Doi | C08F 283/006 520/1 |
| 2006/0189706 | A1 * | 8/2006 | Tokuda | C08F 290/064 522/109 |

FOREIGN PATENT DOCUMENTS

| | | |
|---|---|---|
| JP | 2007-326367 | 12/2007 |
| JP | 2009-061628 | 3/2009 |

OTHER PUBLICATIONS

Machine translation of JP2009-061628A, Mar. 2009, Japan, Takahito et. al.*

"International Search Report (Form PCT/ISA/210)", published on Apr. 24, 2012, with English translation thereof, p. 1-p. 4.

* cited by examiner

*Primary Examiner* — Sanza Mcclendon
(74) *Attorney, Agent, or Firm* — JCIPRNET

(57) ABSTRACT

Described are: an active-energy-ray-curable composition (38) containing a phosphate ester compound of which an aqueous solution prepared by extracting with 50 mL of water per 1 g of the phosphate ester compound has a pH value of 6.5 to 7.5 at 25° C., wherein the value of (the concentration of phosphoric acid in the aqueous solution, expressed in mass ppm)×(the content of the phosphate ester compound in the active-energy-ray-curable composition, expressed in mass %) is 50 or less; and a process for producing a transparent film (40) which includes the active-energy-ray-curable composition (38) and in which a cured resin layer (44) having a fine uneven structure is formed on the surface of a base film (42).

3 Claims, 5 Drawing Sheets

ACTIVE-ENERGY-RAY-CURABLE COMPOSITION, AND PROCESS FOR PRODUCING TRANSPARENT FILM HAVING FINE UNEVEN STRUCTURE ON SURFACE THEREOF

CROSS-REFERENCE TO RELATED APPLICATION

This application is a 371 application of an International PCT application serial no. PCT/JP2012/052099, filed on Jan. 31, 2012, which claims the priority benefit of the Japan Patent Application No. 2011-018225, filed on Jan. 31, 2011. The entirety of each of the above-mentioned patent applications is hereby incorporated by reference herein and made a part of this specification.

TECHNICAL FIELD

The invention relates to an active-energy-ray-curable composition, and a method for producing a transparent film having a fine uneven structure on a surface thereof.

RELATED ART

In recent years, it has been known that an article (such as a transparent film) having a fine uneven structure with a period equal to or less than a wavelength of visible light on its surface exhibits an anti-reflective effect or a lotus effect, etc. Particularly, it has been known that the uneven structure, referred to as a moth-eye structure, acts as an effective anti-reflective means by continuously increasing the refractive index from the value of air to the value of the material of the article.

As a method for producing a transparent film having a fine uneven structure on a surface thereof, for example, a method having the following processes (i) to (iii) is known.

(i) a process of sandwiching an active-energy-ray-curable composition between a mold having an inverted structure of a fine uneven structure on a surface thereof and a base film serving as a body of the transparent film;

(ii) a process of irradiating the active-energy-ray-curable composition by an active energy ray such as an ultraviolet ray or the like to cure the same, thus forming a cured resin layer having a fine uneven structure and obtaining a transparent film;

(iii) a process of separating the transparent film and the mold.

By the way, generally in the above mold, since the period of fine pores is in nanometer order and the aspect ratio of the fine pores is also relatively large, the contact interface between the mold and the active-energy-ray-curable composition increases significantly. As a result, a problem arises in that the mold is difficult to release from the cured resin layer. Accordingly, in particular, the above process (iii) is considered important from the viewpoint of productivity.

As methods of improving releasability between the mold and the cured resin layer, the following methods have been proposed.

(1) a method in which the surface of the side of the mold on which the fine uneven structure has been formed is treated with a release agent (external release agent) (Patent Document 1);

(2) a method in which a solid photocurable transfer layer composed of a photocurable resin composition containing a phosphate ester-based compound is used as an internal release agent (Patent Document 2).

PRIOR-ART DOCUMENTS

Patent Documents

Patent Document 1: Japan Patent Application Publication No. 2007-326367

Patent Document 2: Japan Patent Application Publication. No. 2009-61628

SUMMARY

Problems to be Solved by the Invention

However, when an external release agent is used as in the method (1), in the case where the fine uneven structure of the mold is repeatedly transferred, the external release agent applied to the surface of the mold is peeled off, and the releasability gradually decreases. When the releasability decreases, continuous production of the transparent film becomes difficult.

When an internal release agent is used as in the method (2), there were cases where the surface of the mold was eroded by the internal release agent and the fine uneven structure of the mold varied. When the surface of the mold is eroded, it is anticipated that performances of the transparent film such as anti-reflectivity and the like decrease.

The invention provide an active-energy-ray-curable composition capable of preventing erosion of the surface of a mold and of maintaining releasability between the mold and a cured resin layer for a long time, and a method of continuously producing a transparent film having a fine uneven structure on a surface thereof.

Means for Solving the Problems

After intensive studies, the inventors have found that erosion of a surface of a mold is due to that phosphoric acid remaining in the phosphate ester compound commonly used as an internal release agent dissolves the surface of the mold. Based on the concept that the erosion of the surface of the mold caused by the phosphoric acid may be suppressed by specifying the pH value of the internal release agent and the concentration of the phosphoric acid since the dissolving power of the phosphoric acid to the mold depends on these values, the invention has been accomplished.

Accordingly, the active-energy-ray-curable composition as a first aspect of the invention is characterized by containing a phosphate ester compound of which an aqueous solution prepared by extracting with 50 mL of water per 1 g of the phosphate ester compound has a pH value of 6.5 to 7.5 at 25° C., wherein the value of (concentration of phosphoric acid in the aqueous solution, expressed in mass ppm)×(content of the phosphate ester compound in the active-energy-ray-curable composition, expressed in mass %) is 50 or less.

In addition, the above phosphate ester compound is preferably a polyoxyethylene alkyl phosphate ester compound represented by the following Formula (1).

[Chemical Formula 1]

(1)

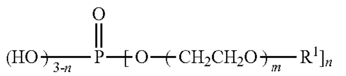

In Formula (1), R1 is an alkyl group, m is an integer of 1 to 20, and n is an integer of 1 to 3.

The method for producing a transparent film having a fine uneven structure on a surface thereof as a second aspect of the invention is a method for producing a transparent film in which a cured resin layer having a fine uneven structure is formed on a surface of a base film, and the method is characterized by having a process of sandwiching the above active-energy-ray-curable composition between the base film and a mold having an inverted structure of the above fine uneven structure on a surface thereof, a process of irradiating the above active-energy-ray-curable composition with an active energy ray to cure the same so as to obtain the transparent film in which the cured resin layer, to which the above inverted structure has been transferred, is formed on the surface of the base film, and a process of separating the obtained transparent film and the above mold.

In addition, the inverted structure of the fine uneven structure on the surface of the above mold is preferably composed of anodic alumina.

Effects of the Invention

With the active-energy-ray-curable composition of the invention, erosion of the surface of the mold can be prevented, and the releasability between the mold and the cured resin layer can be maintained for a long time.

In addition, with the invention, a transparent film having a fine uneven structure on the surface thereof can be continuously produced.

DESCRIPTION OF THE EMBODIMENTS

Figure 1:
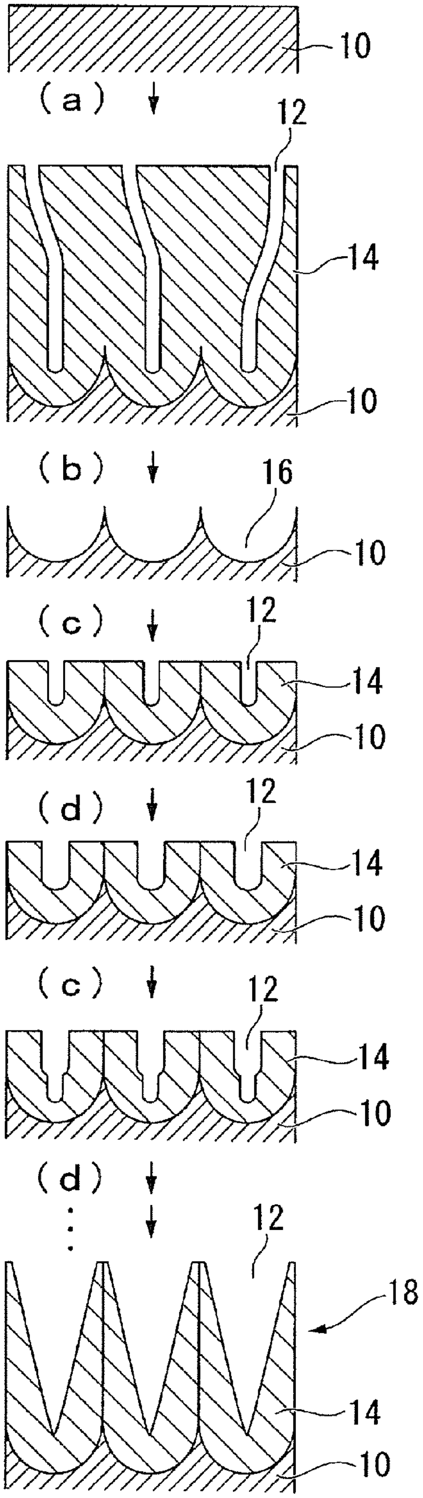
FIG. 1 is a cross-sectional diagram showing a process for producing a mold having anodic alumina on a surface thereof.

The invention is described in detail below.

Further, in this specification, "(meth)acrylate" means acrylate and methacrylate, "transparent" means transmission of at least light with a wavelength of 400 to 1170 nm, and "active energy ray" means visible light, ultraviolet ray, electron beam, plasma, heat ray (infrared ray and the like), etc.

[Active-energy-ray-curable Composition]

The active-energy-ray-curable composition of the invention (hereinafter simply called "curable composition") contains a polymerizable compound, a polymerization initiator, and a phosphate ester compound as an internal release agent.

<Internal Release Agent>

(Phosphate Ester Compound)

The phosphate ester compound is suitable to be an internal release agent because it imparts releasability to a cured resin layer serving as the cured product of the curable composition.

However, there are many cases where phosphoric acid remains in the production process of the phosphate ester compound and this phosphoric acid is considered as a cause of erosion of the mold surface. The erosion of the mold surface caused by the phosphoric acid occurs especially noticeably in the case where a fine uneven structure composed of anodic alumina has been formed on the mold surface. This is because that alumina is easy to dissolve in phosphoric acid.

Furthermore, in the invention, "phosphoric acid" is defined to include dihydrogen phosphate ion, hydrogen phosphate ion and phosphate ion as states after the phosphoric acid is ionized.

Accordingly, to suppress the erosion of the mold surface, a phosphate ester compound with low dissolving power to alumina may be used.

By the way, although the dissolving power of the phosphoric acid to alumina is affected by the pH value of the phosphate ester compound and the phosphoric acid content in the curable composition, it is difficult to directly measure the pH value and the phosphoric acid content.

Therefore, after intensive studies, the inventors have discovered that by specifying the pH of the aqueous solution extracted by a water extraction test of the phosphate ester compound as shown below, and the phosphoric acid content in the curable composition obtained from the phosphoric acid concentration of the above aqueous solution, dissolution of the mold surface caused by the phosphoric acid in the phosphate ester compound may be prevented, and erosion of the mole surface can be suppressed.

Specifically, an aqueous solution of the phosphate ester compound used in the invention prepared by extracting with 50 mL of water per 1 g has a pH value of 6.5 to 7.5 at 25° C.

In addition, the value of (phosphoric acid concentration in the above aqueous solution, expressed in mass ppm)×(content of the phosphate ester compound in the active-energy-ray-curable composition, expressed in mass %) is 50 or less.

A specific water extraction test method is described below.

Firstly, the phosphate ester compound is dissolved in an organic solvent, which can dissolve the phosphate ester compound and is water-insoluble, in a ratio of 50 mL of the organic solvent per 1 g of the phosphate ester compound, followed by adding thereto 50 mL of water per 1 g of the phosphate ester compound to make a mixed liquid. Furthermore, if the amount of water added at this moment is too much or too little, problems may occur in subsequent analysis.

Next, the mixed liquid is strongly stirred with a separatory funnel or the like and then left still. After being separated into two layers consisting of an organic layer and a water layer (aqueous solution), the aqueous solution is collected to measure the pH and the phosphoric acid concentration thereof.

From the viewpoint of the solubility of the phosphate ester compound, examples of the organic solvent include chloroform, diethyl ether, hexane, and so on.

The pH of the aqueous solution may be obtained by a pH testing apparatus.

The aqueous solution has a pH of 6.5 to 7.5 at 25° C. When the pH of the aqueous solution is less than 6.5 or more than 7.5, the mold surface is easily eroded due to dissolution of the mold surface.

The pH of the aqueous solution is preferably more than 6.8 but not more than 7.3, and more preferably 7.0 or more and less than 7.2.

Meanwhile, the phosphoric acid concentration in the aqueous solution may be measured with a titrimetric method or an ion chromatography method.

By the way, the phosphoric acid content in the curable composition also depends on the content of the phosphate ester compound based on 100 mass % of the above curable composition. Accordingly, the phosphoric acid content in the curable composition is specified by using the phosphoric acid concentration in the aqueous solution and the content of the phosphate ester compound in the curable composition.

That is, the phosphoric acid content in the curable composition is represented by the product of the phosphoric acid concentration (expressed in mass ppm) in the above aqueous solution and the content (expressed in mass %) of the phosphate ester compound in the curable composition (phosphoric acid concentration×content of the phosphate ester compound), and this value is preferably 50 or less, and more preferably 30 or less. When this value exceeds 50, the mold surface is dissolved by the phosphoric acid in the phosphate ester compound, and the surface of the mold is easily eroded. In addition, there is no particular limitation with respect to the lower limit of this value.

Furthermore, whether the phosphate ester compound dissolves the mold or not can be determined by immersing the mold in the phosphate ester compound.

Specifically, by immersing the mold in the phosphate ester compound and then examining the mass variation of the mold before and after the immersion, performing cross-section observation of the mold surface after immersion, performing a composition analysis of the mold surface after the immersion, performing a composition analysis of the phosphate ester compound after the immersion, or the like, whether the phosphate ester compound has dissolved the mold is determined.

In the case where the phosphate ester compound is a liquid, it is fine to immerse the mold therein directly. On the other hand, in the case where the phosphate ester compound is a solid, it is fine to immerse the mold in a liquid resulting from heating or decompressing the phosphate ester compound, or in a solution obtained by dissolving the phosphate ester compound in a solvent having no influence on the mold. Particularly, in the case where the phosphate ester compound is dissolved in a solvent, the concentration of the phosphate ester compound is as high as possible so as to quickly determine the dissolving power of the phosphate ester compound to the mold.

In addition, if the mold and the phosphate ester compound are heated in a range of not imparting any bad influence thereto, the determination may be done more quickly.

For the criterion of the immersion time, it is sufficient for performing the immersion at 50° C. for 22 hours.

Such phosphate ester compound is not particularly limited, as long as the pH of the aqueous solution obtained by the extraction test and the phosphoric acid content in the curable composition obtained from the phosphoric acid concentration in the aqueous solution satisfy the above ranges, and it is dissolvable in the curable composition. However, in view of long duration of releasability, a polyoxyethylene alkyl phosphate ester compound represented by the following Formula (1) (hereinafter called "Compound (1)") is preferred.

[Chemical Formula 2]

(1)

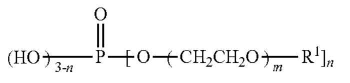

In Formula (1), $R^1$ is an alkyl group. As $R^1$, a $C_{3-18}$ alkyl group is preferred. Specific examples thereof include: straight and branched alkyl groups, such as propyl, isopropyl, butyl, isobutyl, t-butyl, pentyl, isopentyl, hexyl, heptyl, octyl, decyl, dodecyl, pentadecyl, octadecyl and so on; and cyclic alkyl groups, such as cyclohexyl and so on. Among them, octyl, decyl, dodecyl and pentadecyl are preferred.

In addition, in Formula (1), m represents the average molar number of the addition of ethylene oxide and is an integer of 1 to 20, preferably an integer of 1 to 10. Meanwhile, n is an integer of 1 to 3.

Compound (1) may be any of monoester, diester, and triester. In addition, in the case where it is a diester or trimester, the plurality of polyoxyethylene alkyl residues in one molecule may be different from each other. In addition, Compound (1) may be a single substance or a mixture of two or more substances.

By using Compound (1) as the phosphate ester compound, the releasability between the mold and the cured resin layer serving as the cured product of the curable composition is improved more, and this is suitable for formation of the fine uneven structure. In addition, since the load during the release from the mold is extremely low, a transparent film to which a fine uneven structure with few defects has been transferred may be continuously produced.

Among Compounds (1), the phosphate ester compound that satisfies the above conditions of phosphoric acid concentration and pH is available as a commercial product. For example, "TLP-4" produced by Nikko Chemicals Co., Ltd. is suitable.

Furthermore, even if the commercial product is a phosphate ester compound that does not satisfy the above conditions of phosphoric acid concentration and pH (other phosphate ester compounds), it may also be used if the conditions are satisfied by removing the contained phosphoric acid or neutralizing it with a neutralizing agent such as sodium hydroxide or the like.

Examples of other phosphate ester compounds include: "JP-506H" produced by Johoku Chemical Co., Ltd., "MoldWiz INT-1856", "MoldWiz INT-AM121" and "MoldWiz INT-EQ6" by Axel, "TDP-10", "TDP-8", "TDP-6", "TDP-2", "DDP-10", "DDP-8", "DDP-6", "DDP-4", "DDP-2", "TCP-5" and "DLP-10" by Nikko Chemicals Co., Ltd., "LTP2" by Kawaken Fine Chemicals Co., Ltd., and "N3A" and "N10A" by Croda Japan, etc.

The content of the phosphate ester compound is preferably 0.01 to 3 mass parts, more preferably 0.05 to 1 mass part, and even more preferably 0.1 to 0.8 mass part, based on 100 mass parts of the later-described polymerizable compound. If the content of the phosphate ester compound is 0.01 mass part or more, resin residue (release defects) on the mold due to decrease of the releasability can be prevented. Meanwhile, if the content of the phosphate ester compound is 3 mass parts or less, while original performance of the cured resin layer is maintained, resin residue (release defects) on the mold due to decrease of adhesion to the base film can be prevented. In addition, during the use of the transparent film, along with prevention of peeling between the base film and the cured resin layer, occurrence of spots and poor appearance may be suppressed.

In the aqueous solution prepared by extracting with 50 mL of water per 1 g of the phosphate ester compound, the phosphoric acid concentration is preferably 0 to 5000 ppm, more preferably 0 to 500 ppm, and even more preferably 100 ppm or less.

<Polymerizable Compound>

Examples of the polymerizable compound include monomers, oligomers and reactive polymers having a radical polymerizable bond and/or a cationic polymerizable bond within the molecule, monomers mentioned later as examples of hydrophobic materials, and monomers mentioned later as examples of hydrophilic materials, etc.

Examples of the monomer having a radical polymerizable bond include mono-functional monomers and poly-functional monomers.

Examples of the mono-functional monomer include: (meth)acrylate derivatives, such as methyl (meth)acrylate, ethyl (meth)acrylate, propyl (meth)acrylate, n-butyl (meth) acrylate, i-butyl (meth)acrylate, s-butyl (meth)acrylate, t-butyl (meth)acrylate, 2-ethylhexyl (meth)acrylate, lauryl (meth)acrylate, alkyl (meth)acrylate, tridecyl (meth)acrylate, stearyl (meth)acrylate, cyclohexyl (meth)acrylate, benzyl (meth)acrylate, phenoxyethyl (meth)acrylate, isobornyl (meth)acrylate, glycidyl (meth)acrylate, tetrahydrofurfuryl (meth)acrylate, allyl (meth)acrylate, 2-hydroxyethyl (meth) acrylate, hydroxypropyl (meth)acrylate, 2-methoxyethyl (meth)acrylate, and 2-ethoxyethyl (meth)acrylate, etc.; (meth)acrylic acid and (meth)acrylonitrile; styrene and styrene derivatives such as α-methyl styrene; (meth)acrylamide and (meth)acrylamide derivatives such as N-dimethyl (meth)acrylamide, N-diethyl (meth)acrylamide and dimethylaminopropyl (meth)acrylamide, etc.

These compounds may be used alone or in combination of two or more.

Examples of the poly-functional monomers include: difunctional monomers, such as ethylene glycol di(meth) acrylate, tripropylene glycol di(meth)acrylate, ethylene oxide isocyanurate-modified di(meth)acrylate, triethylene glycol di(meth)acrylate, diethylene glycol di(meth)acrylate, neopentyl glycol di(meth)acrylate, 1,6-hexanediol di(meth) acrylate, 1,5-pentanediol di(meth)acrylate, 1,3-butylene glycol di(meth)acrylate, polybutylene glycol di(meth)acrylate, 2,2-bis(4-(meth)acryloxypolyethoxyphenyl)propane, 2,2-bis(4-(meth)acryloxyethoxyphenyl)propane, 2,2-bis(4-(3-(meth)acryloxy-2-hydroxypropoxy)phenyl)propane, 1,2-bis (3-(meth)acryloxy-2-hydroxypropoxy)ethane, 1,4-bis(3-(meth)acryloxy-2-hydroxypropoxy)butane, dimethyloltricyclodecane di(meth)acrylate, di(meth)acrylates of ethylene oxide adducts of bisphenol A, di(meth) acrylates of propylene oxide adducts of bisphenol A, neopentyl glycol hydroxypivalate di(meth)acrylate, divinylbenzene, and methylenebisacrylamide, etc.; trifunctional monomers, such as pentaerythritol tri(meth)acrylate, trimethylolpropane tri(meth)acrylate, ethylene oxide-modified tri(meth)acrylates of trimethylolpropane, propylene oxide-modified triacrylates of trimethylolpropane, ethylene oxide-modified triacrylates of trimethylolpropane, and ethylene oxide isocyanurate-modified tri(meth)acrylate, etc.; tetrafunctional or higher monomers, such as condensation mixtures of succinic acid/trimethylolethane/acrylic acid, dipentaerythritol hexa(meth)acrylate, dipentaerythritol penta(meth)acrylate, ditrimethylolpropane tetraacrylate, and tetramethylolmethane tetra(meth)acrylate, etc.; and di-functional or higher urethane acrylates and di-functional or higher polyester acrylates, etc. These compounds may be used alone or in combination of or two or more.

Examples of the monomer having a cationic polymerizable bond include monomers having epoxy, oxetanyl, oxazolyl and vinyloxy, etc., wherein the monomers having epoxy are particularly preferable.

Examples of the oligomer and reactive polymer include: unsaturated polyesters such as condensation products of unsaturated dicarboxylic acid and polyhydric alcohol, polyester (meth)acrylate, polyether (meth)acrylate, polyol (meth)acrylate, epoxy (meth)acrylate, urethane (meth)acrylate, cationic polymerizable epoxy compounds, and homopolymers or copolymers of the above monomers having a radical polymerizable bond on a side chain thereof, etc.

The content of the polymerizable compound in the curable composition is preferably 80 to 99.9 mass parts and more preferably 90 to 99 mass parts, based on 100 mass parts of the curable composition.

<Polymerization Initiator>

In the case of using a photo-curing reaction, examples of the polymerization initiator include: carbonyl compounds, such as benzoin, benzoin methyl ether, benzoin ethyl ether, benzoin isopropyl ether, benzoin isobutyl ether, benzyl, benzophenone, p-methoxybenzophenone, 2,2-diethoxyacetophenone, α,α-dimethoxy-α-phenylacetophenone, methyl phenylglyoxylate, ethyl phenylglyoxylate, 4,4'-bis(dimethylamino)benzophenone, and 2-hydroxy-2-methyl-1-phenylpropan-1-one, etc.; sulfur compounds, such as tetramethylthiuram monosulfide and tetramethylthiuram disulfide, etc.; 2,4,6-trimethylbenzoyl diphenylphosphine oxide, and benzoyl diethoxyphosphine oxide, etc.

These compounds may be used alone or in combination of two or more.

In the case of using an electron beam curing reaction, examples of the polymerization initiator include: benzophenone, 4,4-bis(diethylamino)benzophenone, 2,4,6-trimethylbenzophenone, methyl ortho-benzoylbenzoate, 4-phenylbenzophenone, t-butylanthraquinone, 2-ethyl anthraquinone, thioxanthones such as 2,4-diethylthioxanthone, isopropylthioxanthone and 2,4-dichlorothioxanthone, etc.; acetophenones such as diethoxyacetophenone, 2-hydroxy-2-methyl-1-phenylpropan-1-one, benzyl dimethyl ketal, 1-hydroxycyclohexyl phenyl ketone, 2-methyl-2-morpholino(4-thiomethylphenyl)propan-1-one and 2-benzyl-2-dimethylamino-1-(4-morpholinophenyl)-butanone, etc.;

benzoin ethers such as benzoin methyl ether, benzoin ethyl ether, benzoin isopropyl ether and benzoin isobutyl ether, etc.; acylphosphine oxides such as 2,4,6-trimethylbenzoyl diphenylphosphine oxide, bis(2,6-dimethoxybenzoyl)-2,4,4-trimethylpentylphosphine oxide, bis(2,4,6-trimethylbenzoyl)-phenylphosphine oxide, etc.; methylbenzoyl formate, 1,7-bisacridinylheptane, and 9-phenylacridine, etc.

These compounds may be used alone or in combination of two or more.

The content of the polymerization initiator is preferably 0.1 to 10 mass parts based on 100 mass parts of the polymerizable compound. When the content of the polymerization initiator is less than 0.1 mass part, the polymerization proceeds poorly. Meanwhile, when the content of the polymerization initiator exceeds 10 mass parts, there are cases where the cured resin layer is colored and mechanical strength decreases.

<Other Components>

If required, the curable composition of the invention may also include a well-known additive such as an unreactive polymers, an active-energy-ray sol-gel reactive composition, an ultraviolet absorbent and/or a photo-stabilizer, a lubricant, a plasticizer, an antistatic agent, a flame retardant, a flame-retardant assistants, a polymerization inhibitor, a filler, a silane coupling agent, a coloring agent, a reinforcement agent, an inorganic filler, an additive for improving antifouling properties such as a fluorine compound, fine particles, or an impact-resistant modifier, etc., and a small amount of solvent.

(Unreactive Polymer)

Examples of the unreactive polymer include: acrylic resins, styrene resins, polyurethanes, cellulose resins, polyvinyl butyral, polyesters, and thermoplastic elastomers, etc.

(Active-energy-ray Sol-gel Reactive Composition)

Examples of the active-energy-ray sol-gel reactive composition include: alkoxysilane compounds, and alkyl silicate compounds, etc.

Examples of the alkoxysilane compound include compounds represented by the following Formula (2) (hereinafter called "Compound (2)").

$$R_{2x}Si(OR_3)_y \quad (2)$$

In Formula (2), $R_2$ and $R_3$ each represents a $C_{1-10}$ alkyl group, and x and y are integers satisfying the relationship of x+y=4.

Specific examples of Compound (2) include: tetramethoxysilane, tetra-i-propoxysilane, tetra-n-propoxysilane, tetra-n-butoxysilane, tetra-sec-butoxysilane, tetra-t-butoxysilane, methyltriethoxysilane, methyltripropoxysilane, methyltributoxysilane, dimethyldimethoxysilane, dimethyldiethoxysilane, trimethylethoxysilane, trimethylmethoxysilane, trimethylpropoxysilane, and trimethylbutoxysilane, etc.

Examples of the alkyl silicate compound include compounds represented by the following Formula (3) (hereinafter called "Compound (3)").

$$R_4O[Si(OR_6)(OR_7)O]_zR_5 \quad (3)$$

In Formula (3), $R_4$ to $R_7$ each represents a $C_{1-5}$ alkyl group, and z is an integer of 3 to 20.

Specific examples of Compound (3) are methyl silicate, ethyl silicate, isopropyl silicate, n-propyl silicate, n-butyl silicate, n-pentyl silicate, and acetyl silicate, etc.

(Ultraviolet Absorbent and/or Photostabilizer)

The ultraviolet absorbent and/or photo-stabilizer plays a role of imparting weather resistances such as suppression of yellowish coloring, and suppression of rise of haze, etc.

Examples of the UV absorbent and/or photostabilizer are: benzophenone-based UV absorbent, benzotriazole-based UV absorbent, and hindered amine-based photo-stabilizers, etc. Examples of the commercial products include: "Tinuvin 400", "Tinuvin 479" and "Tinuvin 109" produced by Ciba Specialty Chemicals; UV absorbents produced by Kyodo Chemical Company Limited, such as "Viosorb 110", etc.; and photo-stabilizers produced by Ciba Specialty Chemicals, such as "Tinuvin 152" and "Tinuvin 292", etc.

The ultraviolet absorbent and/or photo-stabilizer may be used alone or in combination of two or more.

The content of the UV absorbent and/or photo-stabilizer is preferably 0.01 to 5 mass parts, more preferably 0.01 to 3 mass parts, even more preferably 0.01 to 1 mass part, and particularly preferably 0.01 to 0.5 mass part, based on 100 mass parts of the polymerizable compound. When the content thereof is 0.01 mass part or more, the effect of improving weather resistances such as suppression of yellowish coloring, or suppression of rise of haze, etc., is easily obtained. Meanwhile, when the content thereof is 5 mass parts or less, since the curable composition is sufficiently cured, it is easy to suppress a decrease of abrasion resistance of the cured resin layer. A decrease of fingerprint wiping properties in weather resistance testing can also be suppressed.

(Hydrophobic Material)

To render the water contact angle of the surface of the fine uneven structure of the cured resin layer 90° or larger, it is preferred to use a composition containing a fluorine-containing compound or a silicone-based compound as the curable composition capable of forming a hydrophobic material. Here, the hydrophobic material means a material rendering the water contact angle of the surface of the fine uneven structure of the cured resin layer 90° or larger.

Fluorine-Containing Compound:

As the fluorine-containing compound, a compound having a fluoroalkyl group and represented by the following Formula (4) is preferred.

$$-(CF_2)_q-X \quad (4)$$

In Formula (4), X represents a fluorine atom or a hydrogen atom, q represents an integer of 1 or more, preferably an integer of 1 to 20, more preferably an integer of 3 to 10, and particularly preferably an integer of 4 to 8.

Examples of the fluorine-containing compound include: fluorine-containing monomers, fluorine-containing silane coupling agents, fluorine-containing surfactants, and fluorine-containing polymers, etc.

Examples of the fluorine-containing monomers include: fluoroalkyl-substituted vinyl monomers, and fluoroalkyl-substituted ring-opening polymerizable monomers, etc.

Examples of the fluoroalkyl-substituted vinyl monomer include: fluoroalkyl-substituted (meth)acrylates, fluoroalkyl-substituted (meth)acrylamides, fluoroalkyl-substituted vinyl ethers, and fluoroalkyl-substituted styrenes, etc.

Examples of the fluoroalkyl-substituted ring-opening polymerizable monomers include: fluoroalkyl-substituted epoxy compounds, fluoroalkyl-substituted oxetane compounds, and fluoroalkyl-substituted oxazoline compounds, etc.

As the fluorine-containing monomer, a fluoroalkyl-substituted (meth)acrylate is preferred, and a compound represented by the following Formula (5) is particularly preferred.

$$CH_2=C(R_8)C(O)O-(CH_2)_p-(CF_2)_q-X \quad (5)$$

In Formula (5), $R_8$ represents a hydrogen atom or a methyl group, X represents a hydrogen atom or a fluorine atom, p represents an integer of 1 to 6, preferably an integer of 1 to 3 and more preferably 1 or 2, and q represents an integer of 1 to 20, preferably an integer of 3 to 10 and more preferably an integer of 4 to 8.

As the fluorine-containing silane coupling agent, a fluoroalkyl-substituted silane coupling agent is preferred, and a compound represented by the following Formula (6) is particularly preferred.

$$(R_9)_aR_{10b}SiY_c \quad (6)$$

In Formula (6), $R_9$ represents a $C_{1-20}$ fluorine-substituted alkyl group that may contain one or more ether bonds or ester bonds. Examples of $R_9$ include 3,3,3-trifluoropropyl, tridecafluoro-1,1,2,2-tetrahydrooctyl, 3-trifluoromethoxypropyl, and 3-trifluoroacetoxypropyl, etc.

In addition, $R_{10}$ represents a $C_{1-10}$ alkyl group. Examples of $R_{10}$ include methyl, ethyl, and cyclohexyl, etc.

Y represents a hydroxyl group or a hydrolyzable group.

Examples of the hydrolyzable group include alkoxy, halogen atoms, and $R_{11}C(O)O$($R_{11}$ represents a hydrogen atom or a $C_{1-10}$ alkyl group), etc.

Examples of the alkoxy include methoxy, ethoxy, propyloxy, i-propyloxy, butoxy, i-butoxy, t-butoxy, pentyloxy, hexyloxy, cyclohexyloxy, heptyloxy, octyloxy, 2-ethylhexyloxy, nonyloxy, decyloxy, 3,7-dimethyloctyloxy, lauryloxy, etc.

Examples of the halogen atoms include Cl, Br and I, etc.

Examples of $R_{11}C(O)O$ include $CH_3C(O)O$ and $C_2H_5C(O)O$, etc.

In addition, a, b and c represent integers satisfying $a+b+c=4$, $a\geq1$ and $c\geq1$. It is preferred that a=1, b=0 and c=3.

Examples of the fluorine-containing silane coupling agent include: 3,3,3-trifluoropropyltrimethoxysane, 3,3,3-trifluoropropyltriacetoxysilane, dimethyl-3,3,3-trifluoropropylmethoxysilane, and tridecafluoro-1,1,2,2-tetrahydrooctyltriethoxysilane, etc.

Examples of the fluorine-containing surfactant include: fluoroalkyl-containing anionic surfactants, and fluoroalkyl-containing cationic surfactants, etc.

Examples of the fluoroalkyl-containing anionic surfactant include: $C_{2-10}$ fluoroalkylcarboxylic acids and metal salts thereof, disodium perfluorooctanesulfonyl-glutamate, sodium 3-[ω-fluoroalkyl($C_{6-11}$)oxy]-1-alkyl($C_{3-4}$)sulfonate, sodium 3-[ω-fluoroalkanoyl($C_{6-8}$)-N-ethylamino]-1-propanesulfonate, fluoroalkyl($C_{11-20}$)carboxylic acids and metal salts thereof, perfluoroalkyl($C_{7-13}$)carboxylic acids and metal salts thereof, perfluoroalkyl($C_{4-12}$)sulfonic acids and metal salts thereof, perfluorooctanesulfonic diethanolamide, N-propyl-N-(2-hydroxyethyl)perfluorooctanesulfonamide, perfluoroalkyl($C_{6-10}$) sulfonamide propyltrimethylammonium salts, perfluoroalkyl($C_{6-10}$)-N-ethylsulfonylglycine salts, and monoperfluoroalkyl($C_{6-16}$) ethyl phosphates, etc.

Here, the integer after "C" means the carbon number of the alkyl group.

Examples of the fluoroalkyl group-containing cationic surfactant include: fluoroalkyl-containing aliphatic primary, secondary and tertiary amino acids, aliphatic quarternary ammonium salts such as perfluoroalkyl($C_{6-10}$)sulfonamidepropyltrimethylammonium salts, benzalkonium salts, benzethonium chloride, pyridinium salts, and imidazolinium salts, etc.

Examples of the fluorine-containing polymer include: polymers of fluoroalkyl-containing monomers, copolymers of fluoroalkyl-containing monomers and poly(oxyalkylene)-containing monomers, and copolymers of fluoroalkyl-containing monomers and cross-linking reactive group-containing monomers, etc. The fluorine-containing polymer may be a copolymer with other copolymerizable monomers.

As the fluorine-containing polymer, a copolymer of a fluoroalkyl-containing monomer and a poly(oxyalkylene)-containing monomer is preferred.

As the poly(oxyalkylene) group, a group represented by the following Formula (7) is preferred.

$$-(OR_{12})_r- \quad (7)$$

In Formula (7), $R_{12}$ represents a $C_{2-4}$ alkylene group, and r represents an integer of 2 or more. Examples of $R_{12}$ include: $-CH_2CH_2-$, $-CH_2CH_2CH_2-$, $-CH(CH_3)CH_2-$, and $-CH(CH_3)CH(CH_3)-$, etc.

The poly(oxyalkylene) group may be composed of the same oxyalkylene unit ($OR_{12}$) or composed of two or more oxyalkylene units ($OR_{12}$). The two or more oxyalkylene units ($OR_{12}$) may be arranged in blocks or at random.

Silicone-Based Compound:

Examples of the silicone-based compound include: (meth)acrylic acid-modified silicones, silicone resins, and silicone-based silane coupling agents, etc.

Examples of the (meth)acrylic acid-modified silicone include silicone (di)(meth)acrylates and so on.

(Hydrophilic Material)

To render the water contact angle of the surface of the fine uneven structure of the cured resin layer 25° or less, it is preferred to use a composition containing at least a hydrophilic monomer as the curable composition capable of forming a hydrophilic material. In addition, from the viewpoint of imparting abrasion resistance and water resistance, a composition containing a cross-linkable poly-functional monomer is preferred. Also, the hydrophilic monomer and the cross-linkable poly-functional monomer may be the same compound, namely a hydrophilic poly-functional monomer. Moreover, the curable composition may also include other monomers. Herein, the hydrophilic material means a material rendering the water contact angle of the surface of the fine uneven structure of the cured resin layer 25° or less.

As the curable composition capable of forming a hydrophilic material, a composition containing the following polymerizable compounds is more preferably used.

The polymerizable compounds include, in a total of 100 mass %, 10 to 50 mass % of a tetra-functional or higher poly-functional (meth)acrylate, 30 to 80 mass % of a di-functional or higher hydrophilic (meth)acrylate, and 0 to 20 mass % of a mono-functional monomer.

Examples of the tetra-functional or higher poly-functional (meth)acrylate include: ditrimethylolpropane tetra(meth)acrylate, pentaerythritol tetra(meth)acrylate, pentaerythritol ethoxy tetra(meth)acrylate, dipentaerythritol hydroxy penta(meth)acrylate, dipentaerythritol hexa(meth)acrylate, a condensation mixture of succinic acid/trimethylolethane/acrylic acid in a molar ratio of 1:2:4, urethane acrylates ("Ebecryl 220", "Ebecryl 1290", "Ebecryl 1290K", "Ebecryl 5129", "Ebecryl 8210", "Ebecryl 8301" and "KRM 8200" produced by Daicel-Cytec Company Ltd.), polyether acrylates ("Ebecryl 81" produced by Daicel-Cytec Company Ltd.), modified epoxy acrylates ("Ebecryl 3416" produced by Daicel-Cytec Company Ltd.), and polyester acrylates ("Ebecryl 450", "Ebecryl 657", "Ebecryl 800", "Ebecryl 810", "Ebecryl 811", "Ebecryl 812", "Ebecryl 1830", "Ebecryl 845", "Ebecryl 846" and "Ebecryl 1870" produced by Daicel-Cytec Company Ltd.), etc.

These compounds may be used alone or in combination of two or more.

As the tetra-functional or higher poly-functional (meth) acrylate, a penta-functional or higher poly-functional (meth) acrylate is more preferred.

The content of the tetra-functional or higher poly-functional (meth)acrylate is preferably 10 to 50 mass %, and, from the viewpoint of water resistance and chemical resistance, more preferably 20 to 50 mass % and particularly preferably 30 to 50 mass %, in 100 mass % of the polymerizable compounds. When the content of the tetra-functional or higher poly-functional (meth)acrylate is 10 mass % or more, the elastic modulus is increased to improve the abrasion resistance. When the content of the tetra-functional or higher poly-functional (meth)acrylate is 50 mass % or less, small cracks are unlikely to occur at the surface, and a poor appearance is unlikely to occur.

Examples of the di-functional or higher hydrophilic (meth)acrylate include: poly-functional acrylates having a long-chain polyethylene glycol, such as "Aronix M-240" and "Aronix M260" produced by Toagosei Co., Ltd., and "NK Ester AT-20E" and "NK Ester ATM-35E" produced by Shin-Nakamura Chemical Co., Ltd., etc.; and polyethylene glycol dimethacrylates, etc.

These compounds may be used alone or in combination of two or more.

In the polyethylene glycol dimethacrylate, the total of the average number of repeating units of the polyethylene glycol chain in one molecule is preferably 6 to 40, more preferably 9 to 30, and particularly preferably 12 to 20. When the average number of repeating units of the polyethylene glycol chain is 6 or more, the hydrophilicity is adequate, and the antifouling properties are improved. When the average number of repeating units of the polyethylene glycol chain is 40 or less, the compatibility with the tetra-functional or higher poly-functional (meth)acrylate is good, and the curable composition is difficult to separate.

The content of the di-functional or higher hydrophilic (meth)acrylate is preferably 30 to 80 mass % and more preferably 40 to 70 mass %, in 100 mass % of the polymerizable compound. When the content of the di-functional or higher hydrophilic (meth)acrylate is 30 mass % or more, the hydrophilicity is adequate, and the antifouling properties are improved. When the content of the di-functional or higher hydrophilic (meth)acrylate is 80 mass % or less, the elastic modulus is increased to improve the abrasion resistance.

As the mono-functional monomer, a hydrophilic mono-functional monomer is preferred.

Examples of the hydrophilic mono-functional monomer include: mono-functional (meth)acrylates having a polyethylene glycol chain in the ester group, such as "M-20G", "M-90G" and "M-230G" produced by Shin-Nakamura Chemical Co., Ltd and so on; mono-functional (meth) acrylates having a hydroxyl group in the ester group, such as hydroxyalkyl (meth)acrylates and so on; mono-functional acrylamides; and cationic monomers, such as methacrylamidopropyl trimethylammonium methyl sulfate and methacryloyloxyethyl trimethylammonium methyl sulfate, etc.

In addition, as the mono-functional monomer, a viscosity modifier such as acryloyl morpholine or vinyl pyrrolidone, etc., or an adhesion improver such as acryloyl isocyanate that improve the adhesion to the base film, etc. may also be used.

The content of the mono-functional monomer is preferably 0 to 20 mass %, and more preferably 5 to 15 mass %, in 100 mass % of the polymerizable compound. Due to the use of the mono-functional monomer, the adhesion between the base film and the cured resin layer is improved. When the content of the mono-functional monomer is 20 mass % or less, the tetra-functional or higher poly-functional (meth) acrylate or the di-functional or higher hydrophilic (meth) acrylate is not insufficient, and the antifouling properties or the abrasion resistance is sufficiently exhibited.

One or more of the mono-functional monomers may be added to the curable composition as a (co)polymerized low-polymerization degree polymer in an amount of 0 to 35 mass parts in 100 mass parts of the polymerizable compounds. Examples of the low-polymerization degree polymer include: a copolymerized oligomer (e.g. "MG Polymer" produced by MRC Unitec Co., Ltd.) of a mono-functional (meth)acrylate having a polyethylene glycol chain in the ester group, such as "M-230G" produced by Shin-Nakamura Chemical Co., Ltd., and methacrylamidopropyl trimethylammonium methyl sulfate in a ratio of 40/60, and the like.

<Effects>

Because the curable composition of the invention described above contains a specific phosphate ester compound as the internal release agent, the releasability between the mold and the cured resin layer may be maintained for a long time. In addition, this specific phosphate ester compound is difficult to dissolve the surface of the mold. Therefore, with the curable composition of the invention, the erosion of the mold can be suppressed.

[Production Method of Transparent Film]

The method for producing a transparent film having a fine uneven structure on a surface thereof (hereinafter simply called "transparent film") of the invention includes a process of sandwiching the above curable composition of the invention between a base film and a mold having an inverted structure of the above fine uneven structure on a surface thereof (sandwiching process), a process of irradiating the curable composition with an active energy ray to cure the same to obtain a transparent film in which the cured resin layer, to which the inverted structure of the mold has been transferred, is formed on the surface of the base film (transfer process), and a process of separating the obtained transparent film and the mold (separation process).

<Base Film>

As the base film, because the active energy ray irradiates across the film, a highly transparent film is preferred. For example, acrylic film, a PET (polyethylene terephthalate) film, a polycarbonate film, or a TAC (triacetylcellulose) film, etc. may be used.

<Mold>

Examples of the material of the mold include: metals (including those with a surface on which an oxide film has been formed), quartz, glass, resins, and ceramics, etc.

The mold used in the invention may be produced by, for example, methods (I) and (II) as shown below. Among them, from the viewpoint of the possibility of making a large area and simplification of the manufacture, the method (I) is particularly preferred.

(I) a method of forming anodic alumina having a plurality of fine pores (recesses) on a surface of an aluminum substrate.

(II) a method of forming a fine uneven structure on a surface of the substrate by using lithography.

The method (I) preferably includes the following processes (a) to (e):

(a) a process of forming an oxide film on a surface of an aluminum substrate by anodizing the aluminum substrate in an electrolyte under a constant voltage, (b) a process of removing the oxide film and forming anodized fine pore-generating points on the surface of the aluminum substrate, (c) a process of forming an oxide film having fine pores at the fine pore-generating points by re-anodizing the aluminum substrate in an electrolyte, (d) a process of enlarging a diameter of the fine pores, and (e) a process of repeating the processes (c) and (d) to obtain a mold in which the anodic alumina having a plurality of fine pores is formed on the surface of the aluminum substrate.

Process (a):

As shown in FIG. 1, when an aluminum substrate 10 is anodized, an oxide film 14 having fine pores 12 is foamed.

Examples of the shape of the aluminum substrate include: a roll shape, a cylindrical shape, a plate shape, and a sheet shape, etc.

In addition, to smooth the surface of the aluminum substrate, it is preferred to polish the aluminum substrate through mechanical polishing, fabric polishing, chemical polishing, or electrolytic polishing (etching), etc. In addition, because the oil used in a process for forming a predetermined shape may adhere to the aluminum substrate, it is preferred to perform a degreasing treatment to the aluminum substrate in advance prior to the anodization.

The purity of the aluminum is preferably 99% or more, more preferably 99.5% or more, and particularly preferably 99.8% or more. When the purity of aluminum is low, during the anodization, an uneven structure with a size scattering visible light is formed due to segregation of the impurities, or the regularity of the fine pores obtained by the anodization may be lowered.

Examples of the electrolyte include: sulfuric acid, oxalic acid, and phosphoric acid, etc.

In the case of using oxalic acid as the electrolyte, the concentration of the oxalic acid is preferably 0.7 M or less. When the concentration exceeds 0.7 M, the current becomes so high that the surface of the oxide film may become rough.

When the formation voltage is 30 to 60 V, anodic alumina having fine pores with high regularity at an average interval of 100 nm can be obtained. Whether the formation voltage is higher or lower than this range, the regularity tends to decrease.

The temperature of the electrolyte is preferably 60° C. or less and more preferably 45° C. or less. When the temperature of the electrolyte exceeds 60° C., a so-called "burning" phenomenon occurs, and thus the fine pores are damaged or the regularity of the fine pores is disrupted due to melting of the surface.

In the case of using sulfuric acid as the electrolyte, the concentration of the sulfuric acid is preferably 0.7 M or less. When the concentration exceeds 0.7 M, the current becomes so high that it may be impossible to maintain a constant voltage.

When the formation voltage is 25 to 30 V, anodic alumina having fine pores with high regularity at an average interval of 63 nm may be obtained. Whether the formation voltage is higher or lower than this range, the regularity tends to decrease.

The temperature of the electrolyte is preferably 30° C. or less and more preferably 20° C. or less. When the temperature of the electrolyte exceeds 30° C., a so-called "burning" phenomenon occurs so that the fine pores are damaged or the regularity of the fine pores is disrupted due to melting of the surface.

Process (b)

As shown in FIG. 1, once the oxide film 14 is removed to form anodized fine pore-generating points 16, the regularity of the fine pores can be improved. Further, in the case where such high regularity is not necessary, it is fine to remove at least a portion of the oxide film 14. After the process (a), a later-described process (d) may be performed.

Examples of the method of removing the oxide film include: a method of removing the oxide film by dissolving the oxide film in a solution that selectively dissolves the oxide film while not dissolving the aluminum. Examples of such kind of solution include: a mixture of chromic acid and phosphoric acid, etc.

Process (c)

As shown in FIG. 1, when the aluminum substrate 10 from which the oxide film has been removed is subjected again to anodization, an oxide film 14 having cylindrical fine pores 12 is formed The anodization may be performed under the same conditions as the process (a). The longer the anodizing time is, the deeper the fine pores obtained can be.

Process (d)

As shown in FIG. 1, a treatment for enlarging the diameter of the fine pores 12 (hereinafter referred to as a fine pore diameter-enlarging treatment) is performed. The fine pore diameter-enlarging treatment is a treatment in which the diameters of the fine pores obtained by anodization are enlarged by immersing the oxide film in a solution that dissolves the oxide film. Examples of such kind of solution include: an aqueous phosphoric acid solution of about 5 mass %.

The longer the time for the fine pore diameter-enlarging treatment is, the larger the diameters of the fine pores can become.

Process (e)

As shown in FIG. 1, when the anodization in the process (c) and the fine pore diameter-enlarging treatment in the process (d) are repeated, the oxide film 14, which has fine pores 12 with a shape of which the diameter continuously decreases in the depth direction from the pore opening, is formed to obtain a mold body 18 having anodic alumina (an aluminum porous oxide film (alumite)) on the surface of the aluminum substrate 10.

The number of the repetitions is preferably three or more in total, and more preferably five or more. If the number of repetitions is two or less, because the diameter of the fine pores decreases discontinuously, a reflectance-reducing effect of the fine uneven structure (moth-eye structure) formed using anodic alumina having such fine pores is insufficient.

Examples of the shape of the fine pore 12 include: a substantially conical shape, a pyramidal shape, and a cylindrical shape, etc. A shape in which a cross-sectional area of the fine pore in the direction perpendicular to the depth direction continuously decreases from the outermost surface toward the depth direction, such as a conical shape, or a pyramidal shape, etc., is preferred.

The average interval between the fine pores 12 is equal to or less than the wavelength of visible light, that is, 400 nm or less. The average interval between the fine pores 12 is preferably 20 nm or more.

The average interval between the fine pores 12 is obtained by measuring the interval between adjacent fine pores 12 (distance from the center of a fine pore 12 to the center of an adjacent fine pore 12) at 50 points by electron microscope observation, followed by averaging these values.

In the case where the average interval is 100 nm, the depth of the fine pores 12 is preferably 80 to 500 nm, more preferably 120 to 400 nm, and particularly preferably 150 to 300 nm.

The depth of the fine pores 12 is obtained by measuring the distance between the lowermost portion of the fine pores 12 and the uppermost portion of a convex portion between the fine pores 12 when observed with an electron microscope at 30000-fold magnification.

The aspect ratio of the fine pores 12 (depth of the fine pores/average interval between the fine pores) is preferably 0.8 to 5.0, more preferably 1.2 to 4.0, and particularly preferably 1.5 to 3.0.

Other Processes

In the invention, the mold body 18 obtained in the process (e) may be used as the mold as it is, or the surface of the side of the mold body 18 on which the fine uneven structure has been formed may be treated with a release agent (external release agent).

As the release agent, one having a functional group capable of foil ling a chemical bond with the anodic alumina of the aluminum substrate is preferred. Specific examples thereof include: silicone resins, fluorine resins, and fluorine compounds, etc. In the viewpoint of good releasability and good adhesion to the mold body, a release agent having a silanol group or a hydrolyzable silyl group is preferred, among which a fluorine compound having a hydrolyzable silyl group is particularly preferred.

Examples of the commercial products of the fluorine compounds having a hydrolyzable silyl group include: fluoroalkyl silane, "KBM-7803" produced by Shin-Etsu Chemical Co., Ltd., the "Optool" series produced by Daikin Industries, Ltd., and "Novec EGC-1720" produced by Sumitomo 3M Ltd., etc.

The treatment method using the release agent is exemplified by the following method 1 and method 2. From the viewpoint that the surface of the mold body on the side where the fine uneven structure has been formed can be treated uniformly with the release agent, the method 1 is particularly preferred.

The method 1 is immersing the mold body in a diluted solution of the release agent.

The method 2 is applying the release agent or a diluted solution thereof to the surface of the side of the mold body where the fine uneven structure has been formed.

The method 1 preferably includes the following processes (f) to (j):

(f) a process of washing the mold body with water, (g) a process of removing water drops adhered to the surface of the mold body by blowing air against the mold body, (h) a process of immersing the mold body in a diluted solution in which a fluorine compound having a hydrolyzable silyl group is diluted by a solvent, (i) a process of slowly lifting the immersed mold body from the solution, and (j) a process of drying the mold body.

Process (f)

Because the agents used when the porous structure is formed (i.e., the phosphoric acid aqueous solution used in the fine pore diameter-enlarging treatment, etc.) and impurities (dust and the like), etc. adhere to the mold body, the agents and impurities, etc. are removed by washing with water.

Process (g)

Visible water drops are mostly removed by blowing air against the mold body.

Process (h)

As the solvent for dilution, well-known solvents such as fluorine-based solvents and alcohol-type solvents, etc. may be used. Among them, from the viewpoint of allowing the solution of the external release agent to be applied uniformly due to their moderate volatility and wettability, etc., fluorine-based solvents are preferable. Examples of the fluorine-based solvents include: hydrofluoropolyether, perfluorohexane, perfluoromethylcyclohexane, perfluoro-1,3-dimethylcyclohexane, and dichloropentafluoropropane, etc.

The concentration of the fluorine compound having a hydrolyzable silyl group is preferably 0.01 to 0.2 mass % in the diluted solution (100 mass %).

The immersion time is preferably 1 to 30 minutes.

The immersion temperature is preferably 0 to 50° C.

Process (i)

When pulling out the immersed mold body from the solution, it is preferred to use an electric pulling device to pull out at a constant speed to reduce swing during pulling. By doing so, uneven coating can be reduced.

The pulling-out speed is preferably 1 to 10 mm/sec.

Process (j)

In the process of drying the mold body, the mold body may be air-dried or be subjected to a forcible heated-air drying process with a dryer or the like.

The drying temperature is preferably 30 to 150° C.

The drying time is preferably 5 to 300 minutes.

Furthermore, whether the surface of the mold body has been treated with the release agent or not can be confirmed by measuring the water contact angle of the surface of the mold body. The water contact angle of the surface of the mold body that has been treated with the release agent is preferably 60° or larger, and more preferably 90° or larger. When the water contact angle is 60° or larger, the surface of the mold body has been well treated with the release agent, and the releasability becomes good.

<Production Apparatus>

Figure 2:
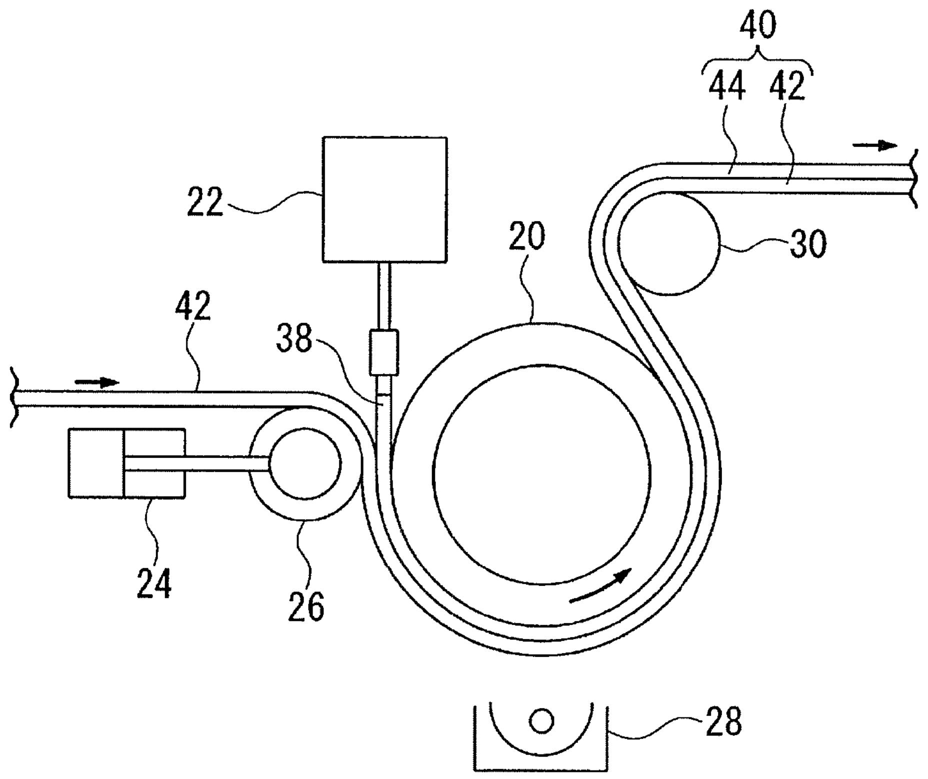
FIG. 2 is a constitution diagram showing an example of an apparatus for producing a transparent film having a fine uneven structure on a surface thereof.

The transparent film is produced, for example, as follows using a production apparatus shown in FIG. 2.

Between a roll-shaped mold 20 having a fine uneven structure (not shown) on a surface thereof and a strip-shaped base film 42 moving along the surface of the roll-shaped mold 20, a curable composition 38 is supplied from a tank 22.

Between the roll-shaped mold 20 and a nip roll 26 for which the nip pressure is adjusted by a pneumatic pressure cylinder 24, the base film 42 and the curable composition 38 are nipped, and at the same time of spreading the curable composition 38 uniformly between the base film 42 and roll-shaped mold 20, the resin composition is filled inside the recesses of the fine uneven structure of the roll-shaped mold 20.

By irradiating the curable composition 38 with an active energy ray through the base film 42 from an active-energy-ray irradiation apparatus 28 installed below the roll-shaped mold 20 to cure the curable composition 38, a cured resin layer 44, to which the fine uneven structure on the surface of the roll-shaped mold 20 has been transferred, is formed.

Figure 3:
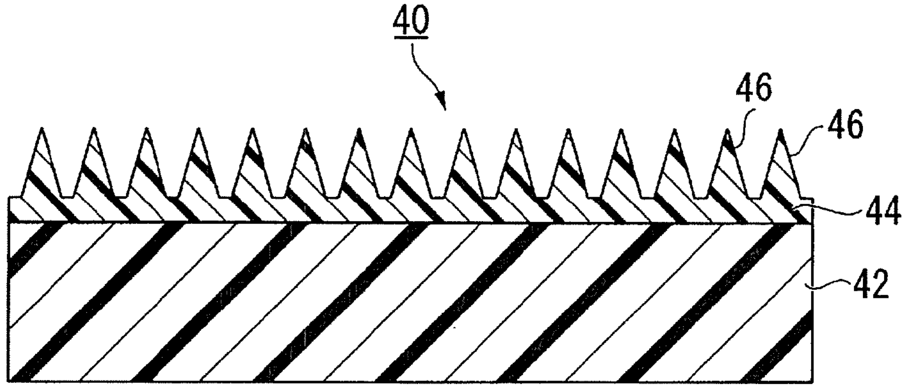
FIG. 3 is a cross-sectional diagram showing an example of a transparent film having a fine uneven structure on a surface thereof.

By separating the base film 42, on which the cured resin layer 44 has been formed on the surface thereof, from the roll-shaped mold 20 with a separating roller 30, a transparent film 40 as shown in FIG. 3 is obtained.

As the active-energy-ray irradiation apparatus 28, a high-pressure mercury lamp or a metal halide lamp, etc. is preferred. The amount of the photo-irradiation energy in this case is preferably 100 to 10000 $mJ/cm^2$.

<Transparent Film>

FIG. 3 is a cross-sectional diagram showing an example of the transparent film 40 having a fine uneven structure on a surface thereof.

The base film 42 is an optically transparent film. Examples of the material of the base film include: an acrylic film, a PET film, a polycarbonate film, and a TAC film, etc.

The cured resin layer 44 is a film composed of a cured product of the curable composition of the invention, and has a fine uneven structure on a surface thereof.

In the case of using a mold of anodic alumina, the fine uneven structure on the surface of the transparent film 40 is formed by transferring the fine uneven structure on the surface of anodic alumina, and has a plurality of convex portions 46 composed of the cured product of the curable composition.

As the fine uneven structure, a so-called moth-eye structure is preferred, in which a plurality of projections (convex portions) having a substantially conical shape or pyramidal shape are arranged. The moth-eye structure has a projection interval equal to or less than the wavelength of visible light, and is known to be an effective anti-reflective means for continuously increasing the refractive index from the value of air to the value of the material.

The average interval between the convex portions is preferably equal to or less than the wavelength of visible light, namely 400 nm or less. Since the average interval between the convex portions is 100 nm to 200 nm in the case of forming the convex portions using a mold of anodic alumina, the average interval is particularly preferably 250 nm or less.

In addition, from the viewpoint of facilitating formation of the convex portions, the average interval between the convex portions is preferably 20 nm or more.

The average interval between the convex portions is determined by measuring the interval between adjacent convex portions (the distance from the center of a convex portion to the center of an adjacent convex portion) at 50 points by electron microscope observation, followed by averaging these values.

In the case where the average interval is 100 nm, the height of the convex portions is preferably 80 to 500 nm, more preferably 120 to 400 nm, and particularly preferably 150 to 300 nm. When the height of the convex portions is 80 nm or more, the reflectance is sufficiently low and the wavelength dependence of reflectance is also low. When the height of the convex portions is 500 nm or less, the abrasion resistance of the convex portions is good.

The height of the convex portions is obtained by measuring the distance from the apex of the convex portions to the lowermost portion of the recesses between the convex portions when observed with an electron microscope at 30000-fold magnification.

The aspect ratio of the convex portions (convex portion height/average interval between convex portions) is preferably 0.8 to 5.0, more preferably 1.2 to 4.0, and particularly preferably 1.5 to 3.0. When the aspect ratio of the convex portions is 0.8 or more, the reflectance is sufficiently low. When the aspect ratio of the convex portions is 5.0 or less, the abrasion resistance of the convex portions is good.

The convex portions preferably has a shape in which the cross-sectional area of the convex portion in the direction perpendicular to the height direction continuously increases from the uppermost surface in the depth direction, namely, a shape in which the cross-sectional shape of the convex portion in the height direction is triangular, trapezoidal or bell-shaped, etc.

The difference between the refractive index of the cured resin layer 44 and that of the base film 42 is preferably 0.2 or less, more preferably 0.1 or less, and particularly preferably 0.05 or less. When the difference between refractive indices is 0.2 or less, the reflection at an interface between the cured resin layer 44 and the base film 42 is suppressed.

In the case of having a fine uneven structure on a surface, it is known that ultra-water repellency is obtained due to the lotus effect if the surface is formed from a hydrophobic material, and ultra hydrophilicity is obtained if the surface is formed from a hydrophilic material.

In the case where the material of the cured resin layer 44 is hydrophobic, the water contact angle of the surface of the fine uneven structure is preferably 90° or larger, more preferably 110° or larger, and particularly preferably 120° or larger. When the water contact angle is 90° or larger, water contaminants are difficult to adhere, thereby developing adequate antifouling properties. In addition, since it is difficult for water to adhere, prevention of icing can be expected.

In the case where the material of the cured resin layer 44 is hydrophilic, the water contact angle of the surface of the fine uneven structure is preferably 25° or less, more preferably 23° or less, and particularly preferably 21° or less. When the water contact angle is 25° or less, the contaminants adhered to the surface are rinsed off with water, and because oil contaminants are difficult to adhere, adequate antifouling properties is developed. From the viewpoint of suppressing deformation of the fine uneven structure due to water absorption of the cured resin layer 44 and an accompanying increase in reflectance, the water contact angle is preferably 3° or larger.

<Application of Transparent Film>

Examples of the applications of the transparent film 40 include: anti-reflective articles, anti-fogging articles, antifouling articles, water repellent articles, and more specifically, antireflection for display, automobile meter covers, automobile mirrors, automobile windows, organic or inorganic electroluminescence light-extraction efficiency improvement parts, and solar cell parts, etc.

<Effects>

In the method for producing the transparent film of the invention described above, because the curable composition of the invention is used, the releasability between the mold and the transparent film is good. Therefore, the transparent film can be continuously produced.

In addition, in the production of the transparent film of the invention, the surface of the mold is difficult to be dissolved by the phosphate ester compound contained in the curable composition. Accordingly, the surface of the mold is difficult to be eroded, and a transparent film excellent in performances such as anti-reflectivity can be produced.

Other Embodiments

The method for producing the transparent film of the invention is not limited to the above method. Although the transparent film 40 is produced by irradiating the base film 42 with an active energy ray using the production apparatus shown in FIG. 2 in the above method, the transparent film may alternatively be produced, for example, as follows using a base film supported by a support film.

Figure 4:
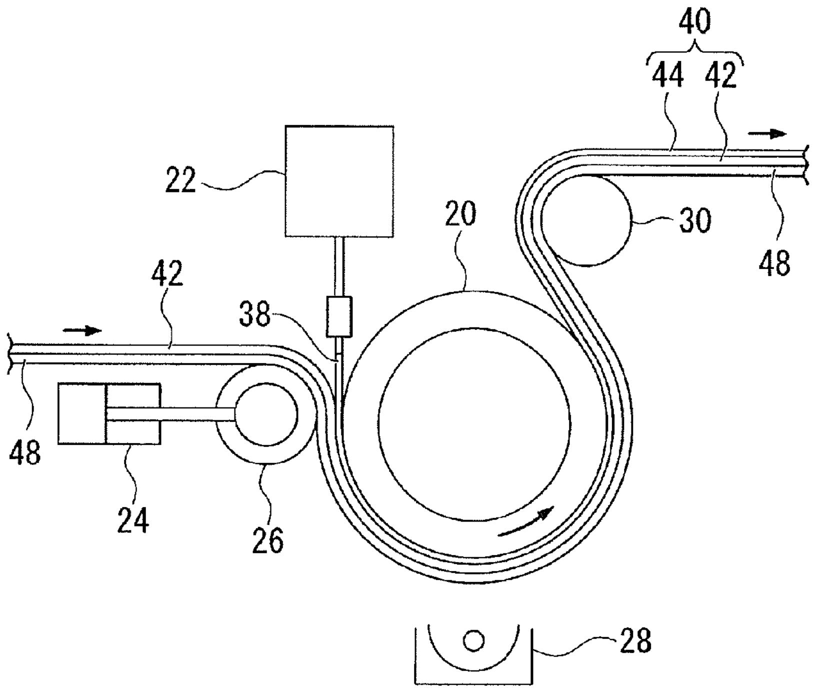
FIG. 4 is a diagram illustrating another production method of a transparent film having a fine uneven structure on a surface thereof.

That is, as shown in FIG. 4, the curable composition 38 is supplied between a surface of the base film 42 supported by a support film 48 from the back side, and the roll-shaped mold 20. By irradiating the curable composition 38 with an active energy ray through the support film 48, the transparent film 40, in which the cured resin layer 44 having a fine uneven structure is formed on the surface of the base film 42, is produced. The transparent film 40 obtained in this way is supported by the support film 48, and, if required, the support film 48 is peeled off from the transparent film 40.

The support film 48 has no particular limitation as long as it is a peelable film. Examples thereof include a PET film and a polycarbonate film, etc.

The support film 48 may be a single-layer film or a multi-layer film.

EXAMPLES

The invention is specifically described below with the examples. However, the invention is not limited thereto.

(Measurement of Phosphoric Acid Concentration And pH)

One gram of the internal release agent was dissolved in 50 mL of chloroform, to which 50 mL of water was added, and the mixed liquid was strongly stirred with a separatory funnel (water extraction test). Next, after being left still, the mixed liquid was separated into an organic layer and a water layer (aqueous solution), and the phosphoric acid ion concentration in the aqueous solution was measured to obtain the phosphoric acid concentration, using an ion chromatograph ("DX-500" manufactured by Nippon Dionex K.K.) under the conditions of Na2$CO_3$ (2.7 mM)/$NaHCO_3$ (0.3 mM) as an eluent, AC12A as a column, IP20 Isocratic as a pump, and a pumping rate of 1.5 mL/min.

In addition, the pH value of the aqueous solution was measured at 25° C. using a pH testing apparatus ("Custany LAB" manufactured by Horiba, Ltd.).

(Electron Microscope Observation)

A portion of the anodic alumina was cut down, and platinum was vapor-deposited on the cross section for 1 minute. The cross section was observed at an acceleration voltage of 3.00 kV using a field-emission scanning electron microscope ("JSM-7400F" manufactured by Japan Electron Optics Laboratory Co., Ltd.) to measure the intervals and the depths of the pores.

(Evaluation of Mold Solubility)

An immersion test was performed by immersing the mold in the internal release agent (phosphate ester compound) at 50° C. for 22 hours. After the immersion test, the mold was taken out and cleaned using acetone and chloroform. The masses of the mold before the immersion and after the cleaning were measured to obtain a decreasing ratio according to the following equation. In addition, with respect to the mold after the cleaning, a scanning electron microscope observation was performed.

$$\text{Decreasing ratio (\%)}=\{(\text{mass of the mold before immersion}-\text{mass of the mold after cleaning})/\text{mass of the mold before immersion}\}\times 100$$

(Measurement of Reflectance)

With respect to the transparent film where the surface of the side on which the fine uneven structure is not formed was painted black, the relative reflectance in the wavelength range of 380 to 780 nm at an incidence angle of 5° was measured using a spectrophotometer ("U-4100" manufactured by Hitachi, Ltd.) to evaluate the reflectance at 550 nm as a luminous reflectance.

(Manufacture of Mold)

An aluminum ingot of 99.9% purity was subjected to a forging treatment, and a cylindrical aluminum prototype, which was cut into a diameter of 200 mm and a length of 350 mm, had no trace of rolling and had an average crystalline particle diameter of 40 μm, was subjected to fabric polishing. Thereafter, the resultant was subjected to electrolytic polishing in a mixed solution of perchloric acid/ethanol (volume ratio: 1/4) to be made into a mirror surface to be used as an aluminum substrate.

Process (a):

With respect to the above aluminum prototype, an anodic oxidation was performed in a 0.3M aqueous solution of oxalic acid for 30 minutes, under the conditions of a direct-current voltage of 40 V and a temperature of 16° C.

Process (b):

The aluminum prototype formed by an oxide film having a 3 μm thickness was immersed in a mixed aqueous solution containing 6 mass % of phosphoric acid and 1.8 mass % of chromic acid for 2 hours to remove the oxide film.

Process (c):

With respect to the above aluminum prototype, an anodic oxidation was performed in a 0.3M aqueous solution of oxalic acid for 38 seconds, under the conditions of a direct-current voltage of 40 V and a temperature of 16° C.

Process (d):

The aluminum prototype formed by the oxide film was immersed in an aqueous solution containing 5 mass % of phosphoric acid for 8 minutes to perform a fine pore diameter-enlarging treatment.

Process (e):

The above processes (c) and (d) were repeated 5 times in total to obtain a roll-shaped mold body with a surface on which anodic alumina having substantially conical fine pores with an average interval of 100 nm and a depth of 200 nm had been formed.

Process (f):

The aqueous solution of phosphoric acid on the surface of the mold body was lightly rinsed off using a shower, followed by immersing the mold body in running water for 10 minutes.

Process (g):

Air was blown from an air gun against the mold body to remove water drops adhering to the surface of the mold body.

Figure 8:
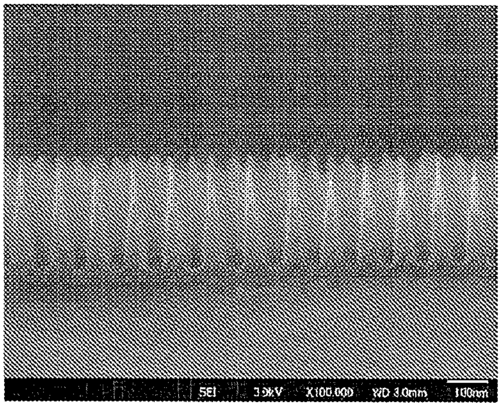
FIG. 8 is a scanning electron microscope image (cross-section image) of a surface of a mold before production of a transparent film having a fine uneven structure on a surface thereof.

A scanning electron microscope image of the obtained mold is shown in FIG. 8.

Figure 5:
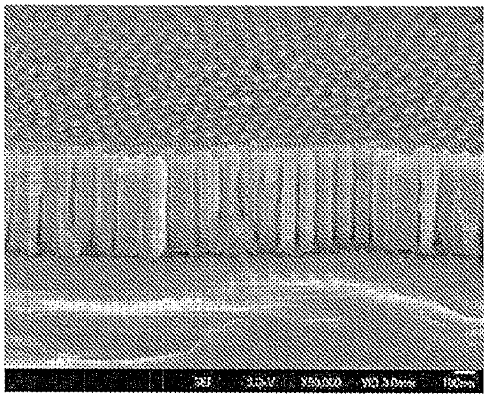
FIG. 5 is a scanning electron microscope image (cross-section image) of a surface of a mold before an immersion test.

Furthermore, for the evaluation of mold solubility, an aluminum plate (of 99.99% purity) of 50 mm×50 mm×0.3 mm (thickness) was used as an aluminum substrate, and the resultant of performing the above processes (a) to (c) (FIG. 5) to the aluminum plate was used.

Example 1

<Preparation of Curable Composition>

A mixed liquid was prepared by mixing 20 mass parts of polyethylene glycol diacrylate ("Aronix M260" produced by Toagosei Co., Ltd.) as a polymerizable compound, 70 mass parts of a condensation mixture of trimethylolethane/acrylic acid/succinic anhydride ("TAS" produced by Osaka Organic Chemical Industry Ltd.), 3 mass parts of hydroxyethyl acrylate (produced by Osaka Organic Chemical Industry Ltd.), and 7 mass parts of methyl acrylate (produced by Mitsubishi Chemical Corporation).

To this mixed liquid, 1.0 mass parts of 1-hydroxycyclohexyl-phenyl ketone ("Irgacure 184" produced by Ciba Specialty Chemicals) as a polymerization initiator, 0.1 mass part of bis(2,4,6-trimethylbenzoyl)-phenylphosphine oxide ("Irgacure 819" produced by Ciba Specialty Chemicals), 0.5 mass part of polyoxyethylene alkyl phosphate ester ("Nikkol TLP-4" produced by Nikko Chemicals Co., Ltd.) as an internal release agent (phosphate ester compound), and 0.2 mass part of an ultraviolet absorbent ("Viosorb 110" produced by Kyodo Chemical Co., Ltd.) were added to prepare a curable composition.

With respect to the phosphate ester compound used in the preparation of the curable composition, a measurement of the phosphoric acid concentration and the pH obtained by a water extraction test was performed. The result is shown in Table 1.

Figure 6:
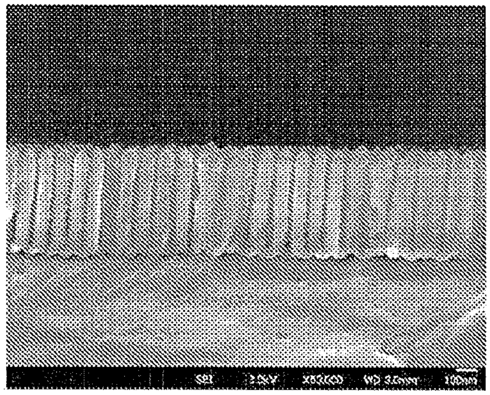
FIG. 6 is a scanning electron microscope image (cross-section image) of a surface of a mold in Example 1.

In addition, an immersion test of the mold was performed using the phosphate ester compound to perform the evaluation of mold solubility. The mass decreasing ratio of the mold is shown in Table 1. Furthermore, a scanning electron microscope image of the mold after the immersion test is shown in FIG. 6.

<Production of Transparent Film>

The transparent film was produced as follows by the production apparatus shown in FIG. 4.

As the roll-shaped mold 20, a previously manufactured mold was used.

As the base film 42, an acrylic film ("Acryplen HBS010" produced by Mitsubishi Rayon Co., Ltd.; thickness: 100 μm) was used. On its back surface, an adhesive-attached PET film ("SAT-116T" produced by Sun A. Kaken Co., Ltd.; thickness: 38 μm) as the support film 48 was laminated.

Between the roll-shaped mold 20 and the strip-shaped base film 42 that moved along the surface of the roll-shaped mold 20 and was supported by the strip-shaped support film 48 from the back side, the curable composition 38 was supplied from the tank 22.

Next, the curable composition 38 was irradiated with an ultraviolet ray having an integral light amount of 800 mJ/cm$^2$ out of the active-energy-ray irradiation apparatus 28 installed below the roll-shaped mold 20, from the side of the support film 48 and through the base film 42, to be cured, and a cured resin layer 44 was formed, to which the fine uneven structure on the surface of the roll-shaped mold 20 had been transferred.

By separating the base film 42 where the cured resin layer 44 had been formed on the surface thereof, along with the support film 48, from the roll-shaped mold 20 with the separating roller 30, the transparent film 40 supported by the support film 48 was obtained.

Comparative Example 1

Figure 7:
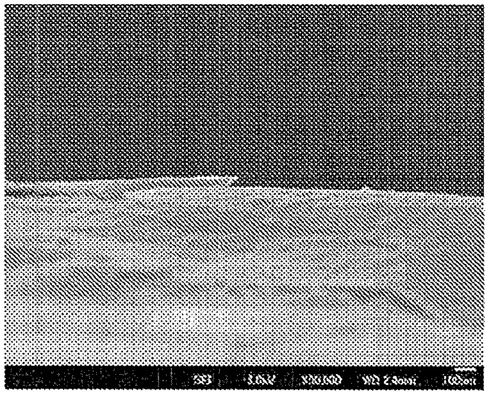
FIG. 7 is a scanning electron microscope image (cross-section image) of a surface of a mold in Comparative Example 1.

A curable composition was prepared and a transparent film produced in the same way as in Example 1, except that 0.5 mass part of the polyoxyethylene alkyl phosphate ester "MoldWiz INT-1856" produced by Axel was used as a substitute for 0.5 mass part of the polyoxyethylene alkyl phosphate ester "Nikkol TLP-4" produced by Nikko Chemicals Co., Ltd. as the phosphate ester compound. The result thereof is shown in Table 1. In addition, a scanning electron microscope image of the mold after the immersion test is shown in FIG. 7.

TABLE 1

| Composition of the curable composition (mass part) | | | Example 1 | Comparative Example 1 |
|---|---|---|---|---|
| Polymerizable compound | | Aronix M260 | 20 | 20 |
| | | TAS | 70 | 70 |
| | | Hydroxyethyl acrylate | 3 | 3 |
| | | Methyl acrylate | 7 | 7 |
| Polymerization Initiator | | Irgacure 184 | 1.0 | 1.0 |
| | | Igacure 819 | 0.1 | 0.1 |
| Internal release agent (Phosphate ester compound) | | Nikkol TLP-4 | 0.5 | — |
| | | MoldWiz INT-1856 | — | 0.5 |

TABLE 1-continued

| | | Example 1 | Comparative Example 1 |
|---|---|---|---|
| Ultraviolet absorbent | Viosorb 110 | 0.2 | 0.2 |
| Content of the phosphate ester compound (mass %) based on 100 mass % of the curable composition | | 0.491 | 0.491 |
| pH of aqueous solution | | 7.1 | 2.5 |
| Phosphoric acid concentration (ppm) in the aqueous solution | | 12 | 130 |
| Phosphoric acid content in the curable composition [Phosphoric acid concentration × content of the phosphate ester compound in the aqueous solution] | | 5.9 | 63.8 |
| Evaluation | Mold solubility [Decreasing ratio (mass %)] | 0 | 0.4 |

It is clear from Table 1 that in the case of Example 1, the mass decreasing ratio of the mold according to the immersion test was 0%, and the mass did not vary. In addition, it is clear from FIGS. 5 and 6 that even compared to the image before the immersion test (FIG. 5), variation in the fine pores of the mold was not identified after the immersion test (FIG. 6). These results indicated that the phosphate ester compound contained in the curable composition in Example 1 is difficult to dissolve the surface of the mold and is capable of suppressing the erosion of the surface of the mold.

Figure 9:
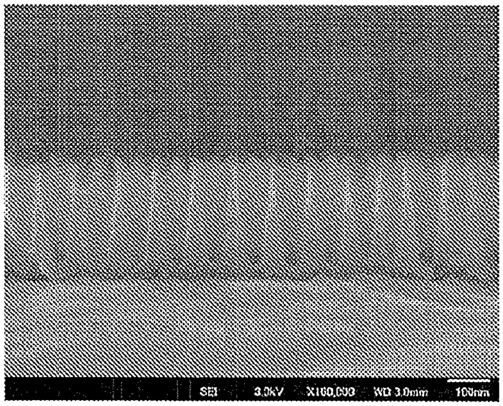
FIG. 9 is a scanning electron microscope image (cross-section image) of a surface of a mold after production of a transparent film having a fine uneven structure on a surface thereof in Example 1.

In addition, in Example 1, it was possible to produce a 600 m transparent film continuously and stably. The average period between the convex portions of the obtained transparent film was 100 nm, and the height of the convex portions was 200 nm. In addition, the transparent film had a luminous reflectance of 0.1% and was excellent in anti-reflectivity. Furthermore, as compared to the image of the mold before the production (FIG. 8), no variation was seen in the image of the mold after the production (FIG. 9).

On the other hand, in the case of Comparative Example 1, the mass decreasing ratio of the mold according to the immersion test was 0.4%. In addition, it is clear from FIGS. 5 and 7 that as compared to the image of the mold before the immersion test (FIG. 5), the fine pores on the mold disappeared after the immersion test (FIG. 7). These results indicated that the surface of the mold was dissolved by the phosphate ester compound contained in the curable composition in Comparative Example 1.

Figure 10:
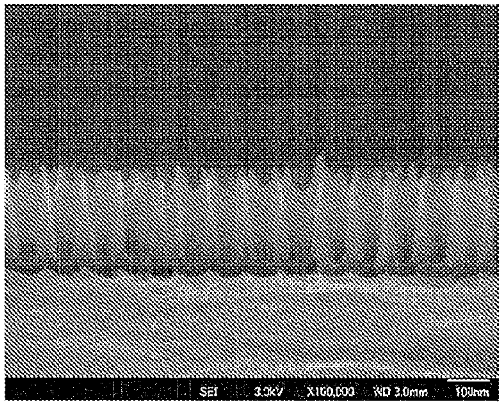
FIG. 10 is a scanning electron microscope image (cross-section image) of a surface of a mold after production of the transparent film having a fine uneven structure on a surface thereof in Comparative Example 1.

In addition, in the transparent film obtained in Comparative Example 1, at an early stage of production the average period between the convex portions was 100 nm and the luminous reflectance was 0.1%. However, when it was produced in a size of 600 m, the depth of the fine pores on the mold (FIG. 10) decreased by about 40 nm as compared to that before the production, and the production was suspended because it was anticipated that the depth of the fine pores of the mold would keep decreasing even if the production was continued.

INDUSTRIAL UTILITY

With the active-energy-ray-curable composition of the invention, erosion of the surface of the mold can be prevented, and the releasability between the mold and the cured resin layer can be maintained for a long time.

In addition, with the invention, a transparent film having a fine uneven structure on a surface thereof can be continuously produced.

What is claimed is:

1. An active-energy-ray-curable composition, comprising a phosphate ester compound, wherein the phosphate ester compound is a polyoxyethylene alkyl phosphate ester compound represented by the following Formula (1):

(1)

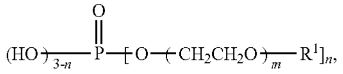

wherein in Formula (1), $R^1$ is alkyl, m is an integer of 1 to 20, and n is an integer of 1 to 3, and wherein the phosphate ester compound is selected such that when the phosphate ester compound is extracted with 50 mL of water per 1 g thereof to prepare an aqueous solution, the aqueous solution has a pH value of 6.5 to 7.5 at 25° C., and wherein the active-energy-ray-curable composition has a value defined by a formula of "(concentration of phosphoric acid in the aqueous solution, expressed in mass ppm)×(content of the phosphate ester compound in the active-energy-ray-curable composition, expressed in mass %)" is 50 or less.

2. A method of producing a transparent film having a fine uneven structure on a surface thereof, wherein the method produces a transparent film in which a cured resin layer having a fine uneven structure is formed on a surface of a base film, and the method comprises:

a process of sandwiching an active-energy-ray-curable composition between the base film and a mold having an inverted structure of the fine uneven structure on a surface thereof, a process of irradiating the active-energy-ray-curable composition with an active energy ray to cure the active-energy-ray-curable composition to obtain the transparent film in which the cured resin layer, to which the inverted structure has been transferred, is formed on a surface of the base film, and a process of separating the obtained transparent film and the mold, wherein the active-energy-ray-curable composition comprises a phosphate ester compound, wherein the phosphate ester compound is a polyoxyethylene alkyl phosphate ester compound represented by the following Formula (1):

(1)

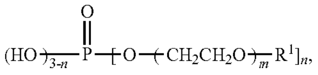

wherein in Formula (1), $R^1$ is alkyl, m is an integer of 1 to 20, and n is an integer of 1 to 3, and wherein the phosphate ester compound is selected such that when the phosphate ester compound is extracted with 50 mL of water per 1 g thereof to prepare an aqueous solution, the aqueous solution has a pH value of 6.5 to 7.5 at 25° C., and wherein the active-energy-ray-curable composition has a value defined by a formula of "(concentration of phosphoric acid in the aqueous solution, expressed in mass ppm)×(content of the phosphate ester compound in the active-energy-ray-curable composition, expressed in mass %)" is 50 or less.

3. The method of claim 2, wherein the inverted structure of the fine uneven structure on the surface of the mold comprises anodic alumina.

* * * * *